(12) United States Patent
    Sallas

(10) Patent No.: US 12,549,796 B2
(45) Date of Patent: Feb. 10, 2026

(54) PREMISES AUTOMATION CONTROL

(71) Applicant: Comcast Cable Communications, LLC, Philadelphia, PA (US)

(72) Inventor: Michael Sallas, Radnor, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/857,687

(22) Filed: Jul. 5, 2022

(65) Prior Publication Data
    US 2022/0337900 A1    Oct. 20, 2022

Related U.S. Application Data

(63) Continuation of application No. 17/153,405, filed on Jan. 20, 2021, now Pat. No. 11,395,030, which is a
    (Continued)

(51) Int. Cl.
    *H04N 21/41*    (2011.01)
    *H04H 20/59*    (2008.01)
    (Continued)

(52) U.S. Cl.
    CPC ........ *H04N 21/4131* (2013.01); *H04H 20/59* (2013.01); *H04L 12/2812* (2013.01);
    (Continued)

(58) Field of Classification Search
    CPC ......... H04N 21/4131; H04N 21/43615; H04N 21/478; H04N 21/482; H04N 21/814;
    (Continued)

(56) References Cited

U.S. PATENT DOCUMENTS

| 3,676,856 A | 7/1972 | Manly |
| 4,684,980 A | 8/1987 | Rast et al. |
| (Continued) | | |

FOREIGN PATENT DOCUMENTS

| FR | 2 792 751 A1 | 10/2000 |
| GB | 2 162 978 A | 2/1986 |
| (Continued) | | |

OTHER PUBLICATIONS

H. V. Dange and V. K. Gondi, "Powerline Communication Based Home Automation and Electricity Distribution System," 2011 International Conference on Process Automation, Control and Computing, Coimbatore, India, 2011, pp. 1-6, doi: 10.1109/PACC.2011.5978900. (Year: 2011).*

(Continued)

*Primary Examiner* — Cynthia M Fogg
(74) *Attorney, Agent, or Firm* — Banner & Witcoff, Ltd.

(57) ABSTRACT

Systems, apparatuses, computer-readable media, and methods are described for sending and receiving a plurality of content streams including audio, video, or audio-video content and one or more command streams. The command streams may include premises automation commands associated with performing one or more functions at a premises. The commands may, for example, instruct a lighting system to turn on/off lights, a security system to enter an arm or disarm operational state, a thermostat to adjust its temperature, etc. One or more user preferences may be set to control which function is performed when a user makes a selection that causes a particular command stream to be processed. Also, different users may have different user preferences to cause different functions to be performed.

22 Claims, 6 Drawing Sheets

| | Program Guide | | | | |
|---|---|---|---|---|---|
| | 8:00 | 8:30 | 9:00 | 9:30 | 10:00 |
| 220 | Show 1 | | Show 2 | | |
| 221 | Show 3 | | Show 4 | | |
| 222 | | Show 5 | | Show 5 | |
| 223 | | Show 6 | | Show 7 | |
| 224 | Arm Security System | | | | |
| 225 | Disarm Security System | | | | |
| 226 | Turn Lights Off | | | | |
| 227 | Goodnight | | | | |
| 228 | Call 911 | | | | |

400

Related U.S. Application Data continuation of application No. 14/084,228, filed on Nov. 19, 2013, now Pat. No. 10,939,155.

(51) Int. Cl.

| | |
|---|---|
| *H04L 12/28* | (2006.01) |
| *H04N 21/4227* | (2011.01) |
| *H04N 21/436* | (2011.01) |
| *H04N 21/47* | (2011.01) |
| *H04N 21/478* | (2011.01) |
| *H04N 21/482* | (2011.01) |
| *H04N 21/81* | (2011.01) |

(52) U.S. Cl.
CPC ... *H04N 21/4227* (2013.01); *H04N 21/43615* (2013.01); *H04N 21/478* (2013.01); *H04N 21/482* (2013.01); *H04N 21/814* (2013.01); *H04L 2012/2849* (2013.01); *H04N 21/47* (2013.01)

(58) Field of Classification Search
CPC .............. H04N 21/47; H04N 21/4532; H04N 21/25891; H04L 12/2803
USPC ......................................................... 725/33
See application file for complete search history.

(56) References Cited

U.S. PATENT DOCUMENTS

| | | | |
|---|---|---|---|
| 5,936,522 A | 8/1999 | Vogt | |
| 6,025,884 A | 2/2000 | Choi | |
| 6,502,669 B1 | 1/2003 | Harris | |
| 6,570,610 B1 | 5/2003 | Kipust | |
| 6,868,292 B2 | 3/2005 | Ficco et al. | |
| 6,912,429 B1 | 6/2005 | Bilger | |
| 6,931,593 B1 | 8/2005 | Grooters | |
| 7,509,221 B2 | 3/2009 | Folken et al. | |
| 8,193,935 B2 | 6/2012 | Gates | |
| 8,742,959 B1* | 6/2014 | Efros .................. | H03M 7/3059 |
| | | | 341/51 |
| 2001/0025349 A1 | 9/2001 | Sharood et al. | |
| 2002/0080827 A1 | 6/2002 | Lee | |
| 2004/0012502 A1 | 1/2004 | Rasmussen | |
| 2004/0030531 A1 | 2/2004 | Miller et al. | |
| 2004/0201471 A1 | 10/2004 | Primm et al. | |
| 2005/0067816 A1 | 3/2005 | Buckman | |
| 2006/0023061 A1 | 2/2006 | Vaszary et al. | |
| 2006/0074810 A1 | 4/2006 | Verberkt et al. | |
| 2006/0176167 A1 | 8/2006 | Dohrmann | |
| 2006/0294565 A1 | 12/2006 | Walter | |
| 2007/0044539 A1 | 3/2007 | Sabol et al. | |
| 2007/0067810 A1* | 3/2007 | Durden ................ | H04N 21/235 |
| | | | 348/E7.071 |
| 2007/0112939 A1 | 5/2007 | Wilson et al. | |
| 2007/0247302 A1 | 10/2007 | Martin | |
| 2007/0276548 A1 | 11/2007 | Uzunovic et al. | |
| 2008/0022322 A1 | 1/2008 | Grannan et al. | |
| 2008/0092199 A1* | 4/2008 | McCarthy .......... | H04N 21/6125 |
| | | | 725/35 |
| 2008/0117072 A1 | 5/2008 | Hallbert et al. | |
| 2008/0150717 A1 | 6/2008 | Guillemot et al. | |
| 2008/0150743 A1 | 6/2008 | Grehant | |
| 2008/0168523 A1 | 7/2008 | Ansari et al. | |
| 2009/0025027 A1 | 1/2009 | Craner | |
| 2009/0070436 A1 | 3/2009 | Dawes et al. | |
| 2009/0249428 A1* | 10/2009 | White ................ | H04N 21/4131 |
| | | | 725/133 |
| 2010/0141425 A1 | 6/2010 | Tracey et al. | |
| 2010/0156667 A1 | 6/2010 | Bennie et al. | |
| 2010/0191352 A1* | 7/2010 | Quail .................... | H04L 12/282 |
| | | | 700/90 |
| 2010/0312366 A1 | 12/2010 | Madonna et al. | |
| 2011/0032423 A1 | 2/2011 | Jing et al. | |
| 2011/0211584 A1 | 9/2011 | Mahmoud | |
| 2012/0066707 A1 | 3/2012 | Poder et al. | |
| 2012/0195449 A1 | 8/2012 | Thiede et al. | |
| 2012/0291068 A1* | 11/2012 | Khushoo ............... | H04L 12/282 |
| | | | 725/38 |
| 2013/0007804 A1 | 1/2013 | Wilson et al. | |
| 2013/0090746 A1* | 4/2013 | Quail .................... | H04L 12/282 |
| | | | 700/17 |
| 2013/0297764 A1* | 11/2013 | Patel ...................... | H04L 41/00 |
| | | | 709/223 |
| 2014/0167929 A1 | 6/2014 | Shim et al. | |
| 2014/0176309 A1 | 6/2014 | Wang et al. | |
| 2014/0321480 A1 | 10/2014 | Xue et al. | |
| 2014/0373074 A1 | 12/2014 | Hwang et al. | |
| 2015/0005900 A1 | 1/2015 | Steele et al. | |
| 2015/0326908 A1* | 11/2015 | Osminer .......... | H04N 21/43615 |
| | | | 386/296 |
| 2015/0349974 A1 | 12/2015 | Liu et al. | |
| 2015/0350912 A1* | 12/2015 | Head ...................... | H04L 63/08 |
| | | | 726/4 |
| 2016/0134918 A1* | 5/2016 | Chen ................ | H04N 21/43615 |
| | | | 725/133 |
| 2017/0127124 A9* | 5/2017 | Wilson ................ | H04L 12/2807 |
| 2018/0267702 A1 | 9/2018 | Dawes | |

FOREIGN PATENT DOCUMENTS

| | | |
|---|---|---|
| KR | 100650740 B1 | 11/2006 |
| WO | 2006/044443 A2 | 4/2006 |
| WO | 2007/147012 A2 | 12/2007 |

OTHER PUBLICATIONS

Partial European Search Report—EP 11181398.6—Mailing date: Apr. 15, 2013.
Chadwick et al: "Home Automation using HomeVision", Internet Citation, Nov. 1996, XP002123844, Retrieved from the internet: URL:http://www.homeautomator.com/homevision.htm [retrieved on Nov. 25, 1999].
Extended European Search Report—EP11181398.6—Mailing Date: Jul. 17, 2013.
European Office Action—EP Appl. 11181398.6—dated Dec. 16, 2015.
Canadian Office Action—CA Appl. 2,751,731—dated Jun. 21, 2017.
Oct. 13, 2017—European Office Action—EP 11181398.6.
Sep. 8, 2017—European Communication Regarding Oral Proceedings—EP 11181398.6.
Jun. 21, 2018—Canadian Office Action—CA 2,751,731.
Feb. 12, 2021—Canadian Office Action—CA 2,751,731.
Junghak Kim, Seungchul Kim, Sangtaick Park and Jinwoo Hong, "Home appliances controlling through Smart TV set-top box with screen-mirroring remote controller," 2013 International Conference on ICT Convergence (ICTC), 2013, pp. 1009-1012, doi: 10.1109/ICTC.2013.6675541. (Year: 2013).
M. Wang, G. Zhang, C. Zhang, J. Zhang and C. Li, "An IoT-based appliance control system for smart homes," 2013 Fourth International Conference on Intelligent Control and Information Processing (ICICIP), Beijing, China, 2013, pp. 744-747, doi: 10.1109/ICICIP.2013.6568171. (Year: 2013).

* cited by examiner

PREMISES AUTOMATION CONTROL

CROSS-REFERENCE TO RELATED APPLICATIONS

This application is a continuation of and claims priority to U.S. patent application Ser. No. 17/153,405 filed on Jan. 20, 2021, which is a continuation of and claims priority to U.S. patent application Ser. No. 14/084,228 filed on Nov. 19, 2013 (now U.S. Pat. No. 10,939,155), each of which is hereby incorporated by reference in its entirety.

BACKGROUND

As more and more home devices become computerized and networked, there is a growing range of possibilities for users to control their homes through electronic devices, such as computers. For example, users may use their smartphones to connect to an Internet site and remotely program their digital video recorder (DVR) to record an upcoming show, or to check on the status of their home security system. The growing range of possibilities, however, increases the need for simplicity, and users will not use features if they are too difficult to navigate. There remains an ever-present need for simplifying the user's ability to take advantage of the various control capabilities within their homes.

SUMMARY

The following summary is for illustrative purposes only, and is not intended to limit or constrain the detailed description.

Features herein relate to allowing users to control many mechanisms within their homes by simply changing channels on their video decoder, or video receiver, such as a set-top-box (STB) or digital video recorder (DVR). Premises automation commands, such as commands to arm or disarm a home security system, turn on or off lights in the premises, adjust a thermostat temperature, etc. may be embedded in a datastream similar to datastreams used to carry different video and/or audio content. These commands may be continuously transmitted on these channels (which correspond to frequencies), and when the user changes the channel on their video receiver to a channel carrying these commands, the video receiver may detect the commands and act on them accordingly. For example, a "Goodnight" channel may carry commands to turn off home interior lights, turn on exterior motion-activated lighting, and arm a home security system. Such commands may repeat in a cycle on the "Goodnight" channel so all the proper commands can be accessed at various times throughout the day.

When the user changes a channel to tune to the Goodnight channel, the video receiver may pass the commands on to a premises automation controller, which can interpret the commands and perform as instructed. Accordingly, as a result of the user tuning to the Goodnight channel, their video receiver may pass the Goodnight commands to the user's home automation controller, which in turn may send commands to turn off the interior lights, turn on exterior motion-activated lighting, and arm a home security system. If the user's premises happens to not have use for any of the commands (e.g., the user has no home security system, or has no automated lighting controls), then those commands may simply be discarded (e.g., the home automation controller may simply determine that those commands are inapplicable to the user's premises). Accordingly, the user can accomplish the various home automation controls with the simple act of changing channels on their STB or DVR.

The home automation commands can control any aspect of a user's home. In addition to home security, lighting and thermostat, other aspects of a home may be controlled as well. For example, one home automation channel may cause the home's phone system to automatically dial the emergency number 911. A user, who might lack a home security system, can simply tune to the 911 channel to automatically initiate an emergency call. This may be convenient for users who may happen to be watching their televisions when an intruder breaks a window, a medical emergency occurs while watching TV or any situation where time is of the essence.

The home automation commands may be carried in-band, in which case the commands are on channels that are tuned to by the video receiver, and those commands may be missed by users who have tuned their video receivers to other channels. In some embodiments, automation commands may also be transmitted on out-of-band channels that are continuously received by the user's video receiver, without regard for the channel (if any) that the user happens to be watching. Such commands may be used, for example, for emergency alert messages, such as tornado alarms. Further, a content provider may use its knowledge of the network, and its customers' locations, to target such messages as needed. For example, the content provider may know that a first neighborhood is affected by a tornado warning, and the content provider may put a tornado warning message on the out-of-band channels being delivered to homes in that first neighborhood.

Transmitting the repeating commands on the command channels allows service to a wide range of users. All users may tune to the "Goodnight" channel, whenever they happen to be retiring for the night, and their respective homes will receive the appropriate commands after tuning to the channel. In some embodiments, users may also customize how their system will respond to such channels. For example, a user may instruct his/her home security system to respond to an "arm" command received on the Goodnight channel as activating window sensors, but leaving motion sensors off for 30 minutes (e.g., allowing the user time to move from the room with the television to the bedroom). Other users may wish to activate the window sensors and motion sensors simultaneously (e.g., if the user watches television from their bedroom anyway).

In some embodiments, the channels carrying home automation commands may be listed in the DVR's electronic program guide (EPG) like any other channel. In some embodiments, the same DVR recording interface may be used to control the scheduling of the home automation. For example, by scheduling the DVR to record the Goodnight channel from Bpm to 6 am, the user's home automation system may execute the commands on the channel beginning at 8 pm, and reverse the commands (e.g., disarming the system, turning lights back on, etc.) at the end of the scheduled recording.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings.

The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
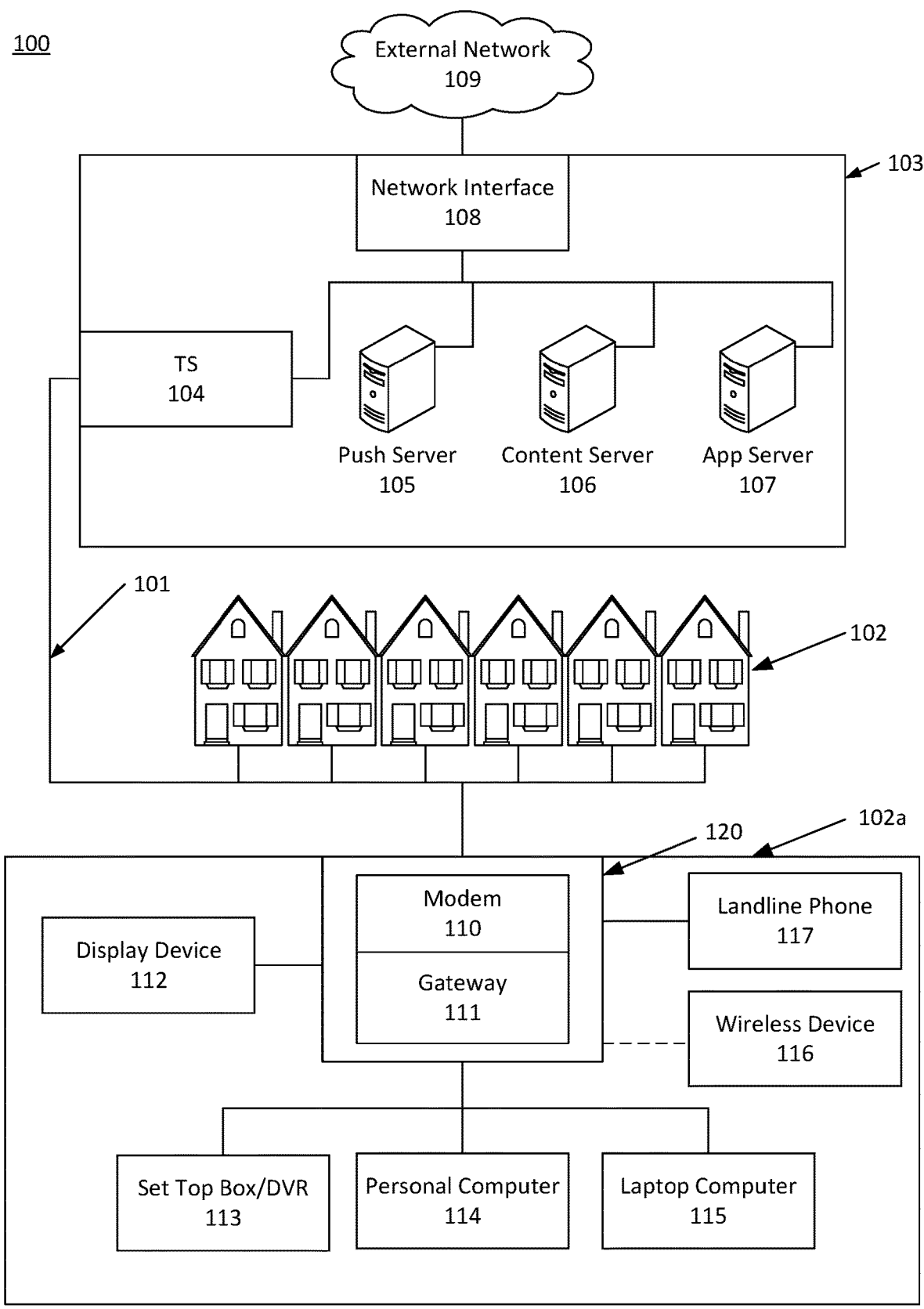
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface 104, such as a termination system (TS). More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server 107 may be responsible for collecting television program listings information and generating a data download for electronic program guide listings. Another application server 107 may be responsible for monitoring user viewing habits and collecting that information for use in selecting advertisements. Yet another application server 107 may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may be a set-top box (STB), digital video recorder (DVR), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
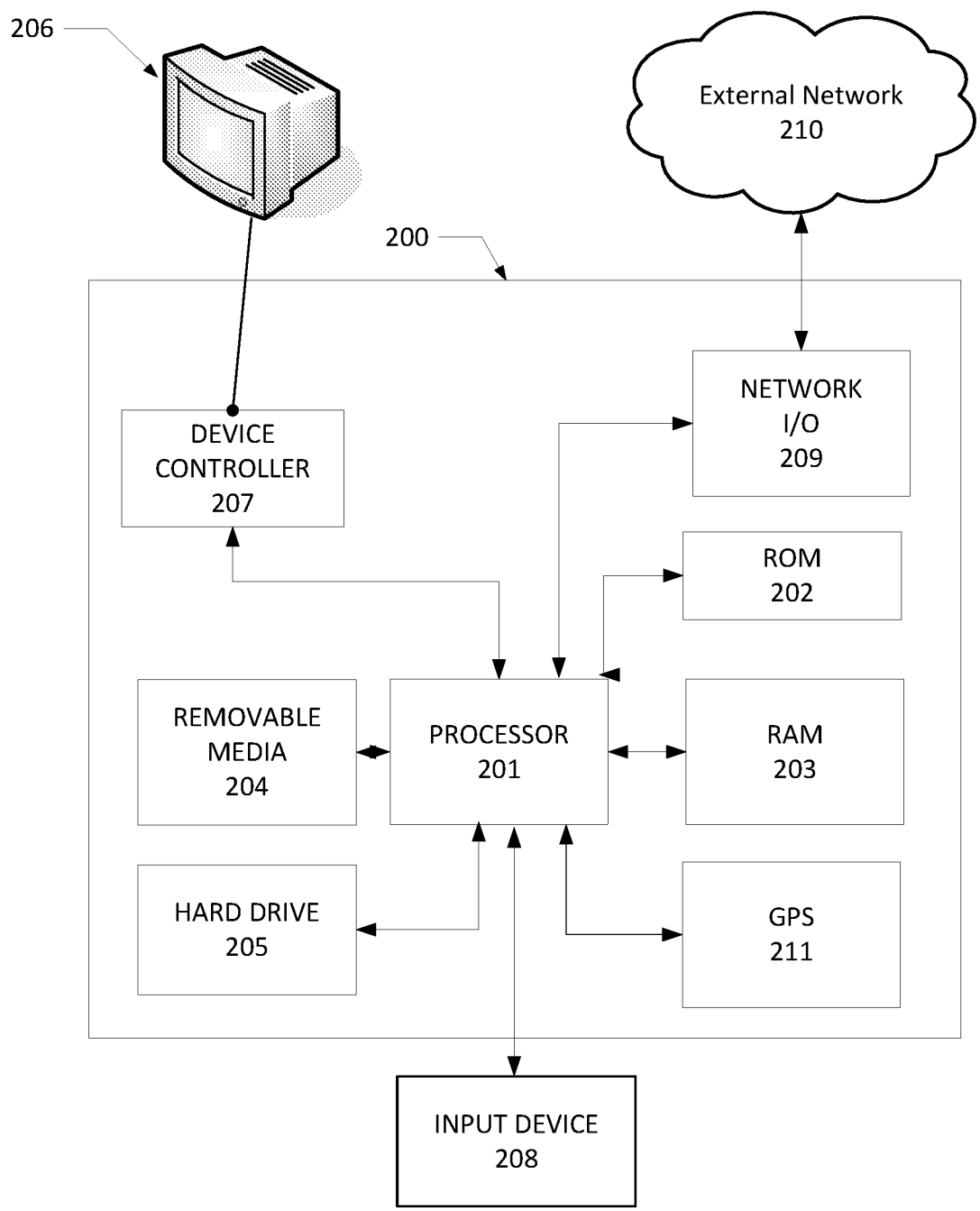
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The example shown in FIG. 2 is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
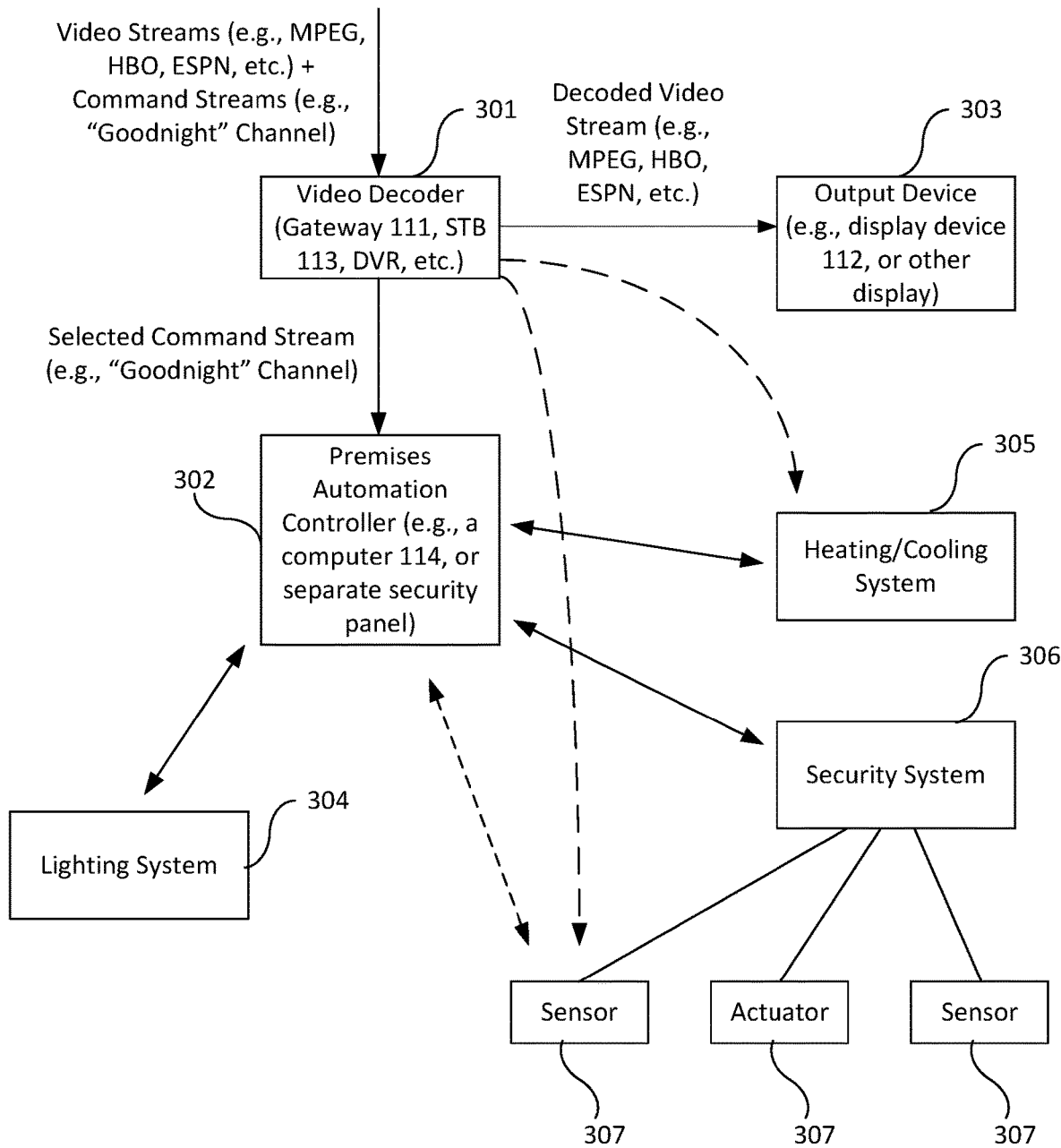
FIG. 3 illustrates an example environment in which aspects of the present disclosure may be implemented.

FIG. 3 illustrates an example environment in which premises automation control may be implemented. As shown in FIG. 3, a video decoder 301 may receive and decode one or more datastreams. The video decoder 301 may be equipped with at least one tuner, at least one radio transceiver (e.g., an IEEE 802.15.4 compliant transceiver), at least one ASIC, at least one processor, and/or memory storing instructions that can be executed by the processor(s) to process datastreams. The one or more datastreams may include content streams (e.g., video streams) and command streams. In either case, the datastreams may be encoded according to a common standard. For example, each of the datastreams, whether they are content streams or command streams, may be encoded according to an MPEG standard (e.g., MPEG-2, MPEG-4).

Each of the content streams may comprise audio, video, or audio/video content. For example, one datastream may comprise a first MPEG stream for a video program (e.g., television program) offered by a service, such as HBO, while another datastream may comprise a second MPEG stream for a video program offered by another service, such as ESPN. Meanwhile, each of the command streams may include commands for controlling a computing device (e.g., a premises automation controller 302) and/or systems of a premises 102. In some embodiments, the command streams may also include software updates for the computing device or components (e.g., microcontrollers, sensors, actuators, etc.) of the systems at the premises 102. Command streams can be modified/updated or added to account for the roll-out of new equipment (e.g., sensors) or new features for equipment already in use when the command streams are generated. The commands on the command streams may be repeating on a continuous or periodic (e.g., at defined intervals) basis. One or more of the datastreams may be delivered (e.g., broadcasted or multicasted) from a local office 103 to a plurality of premises 102 through the network 100 of FIG. 1. As such, video decoders 301 in different premises 102 may receive the same datastreams. Thus, the same content and commands may be made available to video decoders 301 in different locations at approximately the same time (e.g., within a transmission time tolerance). As a result, a set of common command streams may be accessed by a relatively large number of video decoders 301. Accordingly, updates to a common command stream may affect a relatively large number of premises 102.

The video decoder 301 may be controlled to tune to a particular frequency to decode a particular datastream. When a particular frequency is designated, the datastream accessible at that frequency may be considered to be an in-band datastream. In some examples, in addition to decoding an in-band datastream, the video decoder 301 may also decode one or more out-of-band datastreams on one or more predetermined frequencies that are not specified by a user (e.g., person viewing decoded content). For example, a video decoder 301 may be tuned to a first frequency to decode an in-band datastream so that a video program may be displayed on a consumption device (e.g., television) to a user, and in the background, may also tune to a second frequency to decode an out-of-band datastream including commands for a security system. In some embodiments, a video decoder 301 may be set to always decode a particular out-of-band datastream.

Figure 4:
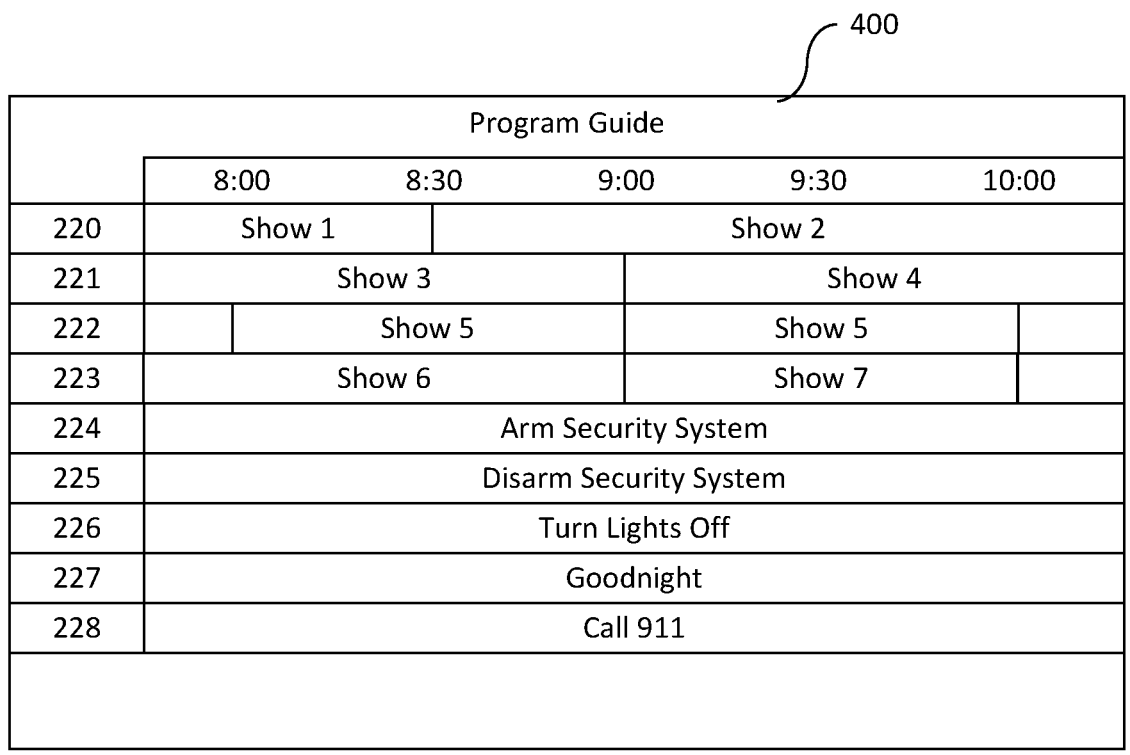
FIG. 4 illustrates an example user graphical interface in accordance with aspects of the present disclosure.

FIG. 4 illustrates an example user graphical interface 400 for the video decoder 301. As shown in FIG. 4, the graphical user interface 400 may include a program guide, such as an electronic program guide (EPG), that depicts a grid with logical channel numbers corresponding to various frequencies (or frequency bands) representing one axis and times representing the other axis. The graphical user interface 400 indicates what data can be accessed on which frequency at various times. The graphical user interface 400 illustrates a plurality of available frequencies each having its own datastream. As shown in FIG. 4, frequencies 220 to 223 may include content streams, while frequencies 224 to 228 may include command streams. For example, frequency 220 includes a content stream that includes content for "Show 1" and then "Show 2." Meanwhile, frequency 224 may include a command stream that includes commands for arming a security system. Other command streams on frequencies 225 to 228 may include commands for other functions. For example, the command stream on frequency 225 may include commands for disarming the security system; the command stream on frequency 226 may include commands for turning lights off; the command stream on frequency 227 may include commands for controlling a combination of systems according to certain settings (e.g., commands for turning off lights, arming a security system, and/or adjusting a thermostat); and the command stream on frequency 228 may include commands for calling 911. These command streams are just examples, and other embodiments may be implemented with more or fewer frequencies having various command streams.

As shown in FIG. 4, frequencies 224 to 228 may be dedicated to carrying certain command streams, and might not carry other data. Therefore, the commands of each command stream may be repeatedly transmitted at their respective frequency. The commands may be continuous such that the commands repeat as soon as they are finished without interruption. Alternatively, the commands may repeat at periodic intervals (e.g., every 15 seconds). In any event, because the frequencies are designated for carrying certain command streams, the commands may be available at any time. In other words, for example, whenever a user selects frequency 224, the video decoder 301 may receive and decode commands for arming a security system. The video decoder 301 may have to wait for the next instance of the commands on the command stream, but because the commands are repeated and can be provided in a relatively short period of time, the wait may be relatively short (e.g., 10 seconds).

Returning to FIG. 3, after decoding a datastream, the video decoder 301 may determine how to handle the decoded data. This determination may be based on whether the datastream decoded is a command stream or a content stream. If the datastream is a command stream, the video decoder 301 may transfer the command stream to a premises automation controller 302. In contrast, if the datastream is a content stream, the video decoder 301 may transfer the content stream (e.g., video stream) to an output device 303 (e.g., a display device 112, such as a television, monitor, projector, etc.). The output device 303 may then render a display based on the content stream so that a user may consume (e.g., view, listen, etc.) the corresponding content (e.g., a television program).

To pass the command stream, the video decoder 301 may be equipped with a radio or other wireless communication interface. The video decoder 301 may be configured to establish, for example, an IEEE 802.15.4 wireless connection (or ZigBee compatible connection) with the premises automation controller 302. When the command stream is passed to the premises automation controller 302, the premises automation controller 302 may evaluate the command stream. The premises automation controller 302 may include memory and at least one processor for executing instructions stored on the memory so that the premises automation controller 302 may handle one or more command streams. In some embodiments, the premises automation controller 302 may be implemented with one or more ASICs. Moreover, the premises automation controller 302 may be configured to communicate with the video decoder 301 and one or more other devices. For example, the premises automation controller 302 may also include an interface for establishing an IEEE 802.15.4 connection with the video decoder 301 to receive the command stream. Other wireless protocols may also be used. Alternatively, a wired connection may be established between the video decoder 301 and the premises automation controller 302.

Although FIG. 3 illustrates the premises automation controller 302 as being separate from the video decoder 301, the two devices may be implemented within the same apparatus. As such, in some embodiments, the video decoder 301 may operate as the premises automation controller 302. For example, the memory of the video decoder 301 may include computer-executable instructions for evaluating the command stream.

The premises automation controller 302 may evaluate the command stream to determine where to transfer the commands. Different commands may be intended or designed for controlling different devices. For example, some commands may be for turning on/off lights, while other commands may be for adjusting a thermostat. In some cases, the premises automation controller 302 may be configured to convert the commands from the command stream to its own commands. Also, the premises automation controller 302 may be configured to generate commands based on the command stream and user preferences and/or a schedule. For example, if a recognized user chooses a goodnight frequency, the premises automation controller 302 may receive the commands on the goodnight frequency, generate a modified version of the received commands according to goodnight settings associated with the recognized user, and send the modified version of commands to other devices on the premises 102.

Because the premises automation controller 302 may be configured to communicate with a number of different systems (e.g., a lighting system 304, a heating/cooling system 305, and/or a security system 306), the premises automation controller 302 may be equipped with a number of wired/wireless interfaces configured to communicate using various protocols (e.g., Bluetooth, ZigBee, IEEE 802.11, etc.). Once the premises automation controller 302 determines that a specific command should be transferred to a specific system, the premises automation controller 302 may transfer the command over the appropriate connection.

FIG. 3 illustrates several example systems that the premises automation controller 302 may communicate with. The premises automation controller 302 may send commands to the lighting system 304 to turn on/off lights within the lighting system 304. The lighting system 304 may include its own controller that determines which lights in the system should be on and which should be off. Alternatively, the premises automation controller 302 itself may determine which lights in the system should be on and which should be off. In such cases, the premises automation controller 302 may convert the commands from the command stream received from the video decoder 301 into electrical signals for turning on/off particular lights. The premises automation controller 302 may include switches and/or separate microcontroller(s) for controlling the lights of the lighting system 304.

The premises automation controller 302 may also send commands to the heating/cooling system 305. Specifically, the premises automation controller 302 may send commands to a thermostat of the heating/cooling system 305 to regulate temperature. For example, if a user selects a frequency having commands for setting a temperature while people are not home, the premises automation controller 302 may determine the temperature settings for that home in response to the commands and control a thermostat of the heating/cooling system 305 in accordance with the temperature settings.

In some embodiments, the premises automation controller 302 may send commands to a security system 306. Specifically, the premises automation controller 302 may send commands to a security system controller via a wired/wireless connection. Thus, the video decoder 301 and premises automation controller 302 may be used as another interface, separate from a control panel, of the security system 306. For example, if the user selects a frequency to receive a command stream and the premises automation controller 302 identifies a command to arm the security system 306 from that command stream, the premises automation controller 302 may instruct the security system 306 to enter an arm mode. Entering such an arm mode may activate certain sensors and/or actuators 307, such as sensors for detecting the opening of doors and windows and/or actuators for locking and unlocking doors.

As illustrated by the dotted arrow in FIG. 3, the premises automation controller 302 may communicate directly with one or more of the sensors or actuators 307. Some commands of the command streams may be configured so that they can directly control the sensors or actuators 307. Likewise, some sensors or actuators 307 may be configured, with software or ASICs, to interpret and process the commands received directly from the premises automation controller 302. For example, the premises automation controller 302 may send commands, carried on a door lock/unlock frequency, for locking or unlocking a front door directly to a door locking/unlocking actuator 307.

FIG. 3 further illustrates that, in some embodiments, the video decoder 301 may directly communicate with one or more systems 304-306 or sensors 307 thereof. In such cases, the systems 304-306 or sensors 307 may then report their status (or mode) to the premises automation controller 302, so the premises automation controller 302 can track the status of the various systems 304-306 and sensors 307. For example, if a user selects frequency 226 (see FIG. 4) to turn lights off, the video decoder 301 may transmit one or more signals directly to one or more light switches of the lighting system 304 instructing the switches to turn their respective lights off. The switches may then report their status (e.g., off state) to the premises automation controller 302.

Although FIG. 3 illustrates several example systems that the premises automation controller 302 may communicate with, it should be understood that other systems may also be integrated. For example, an intercom system may be integrated so that users may communicate to visitors outside a building or others inside the building through a video decoder 301 and/or premises automation controller 302 while consuming content (e.g., watching television). A plain old telephone service (POTS) or VOIP system could be integrated so that users could initiate a call through their television by selecting a frequency. Different frequencies could be set up to call different telephone numbers (e.g., police, fire department, 911, an alarm center, etc.). Also, frequencies could be set up to call certain contacts according to user preferences. Additionally, a coffee maker, stove, washing machine, and/or other appliance (each of which is an example of system) may be integrated and controlled through selection of command streams received from a local office 103.

Figure 5:
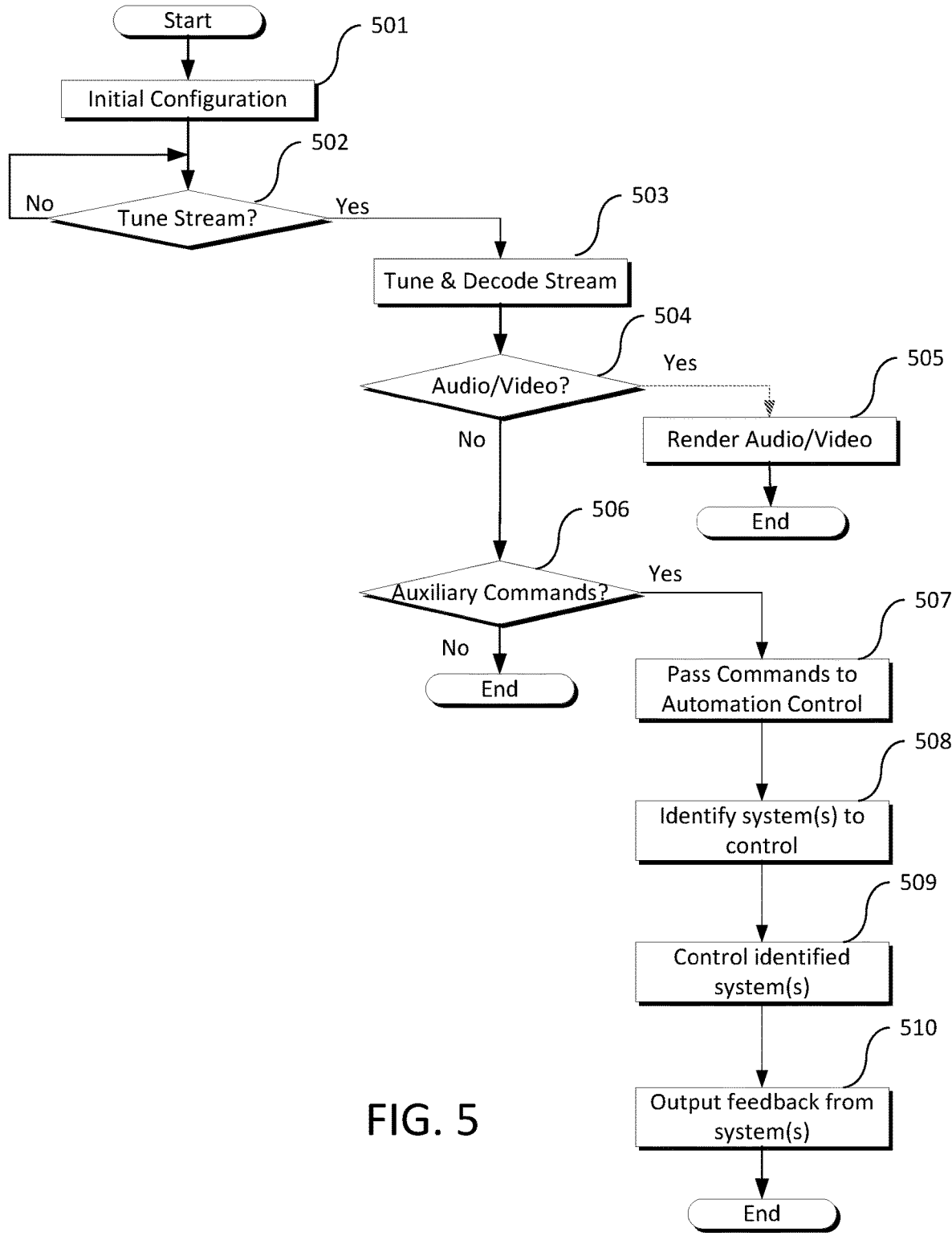
FIG. 5 illustrates a flow diagram of a method in accordance with aspects of the present disclosure.

FIG. 5 illustrates a method of controlling systems on a premises 102 through a video decoder 301. Many of the steps in the method of FIG. 5 may be performed by the video decoder 301 and/or premises automation controller 302. Specifically, for example, computer-executable instructions may be configured to implement the steps when executed by processor(s) of the video decoder 301 and/or premises automation controller 302.

In step 501, an initial configuration may be performed. Step 501 may include establishing connections between a video decoder 301 and a premises automation controller 302, a video decoder 301 and systems 304-306 and/or sensors 307 thereof, and/or a premises automation controller 302 and systems 304-306 and/or sensors 307 thereof. Different premises 102 may have different premises automation controllers 302 and systems 304-306, and therefore, the video decoder 301 may be configured to interact with the various premises automation controllers 302 and systems 304-306. The various premises automation controllers 302 may use different protocols, so the initial configuration at step 501 may include informing the video decoder 301 about which types of premises automation controller 302, systems 304-306, and sensors 307 are available on the premises 102. In some cases, a user may manually inform the video decoder 301 of the types of premises automation controller 302, systems 304-306, and sensors 307 by, for example, entering model numbers associated with the premises automation controller 302, systems 304-306, and/or sensors 307 into the video decoder 301. In other cases, the video decoder 301 may be configured to automatically detect the presence of a premises automation controller 302, systems 304-306, and/or sensors 307. For example, the video decoder 301 may automatically scan wireless frequencies for beacon signals wirelessly transmitted by the premises automation controller 302, systems 304-306, and/or sensors 307. Or, the video decoder 301 may automatically analyze (e.g., load and execute) firmware retrieved from the premises automation controller 302, systems 304-306, and/or sensors 307 via a direct or indirect, wired connection with such equipment.

The initial configuration of step 501 may also include a step in which the premises automation controller 302 may be programmed with computer-executable instructions to interpret commands and react as desired. In some examples, the initial configuration may include setting up a line of communication (which may include, e.g., selecting a communication protocol) between the premises automation controller 302 and one or more systems available at the premises 102. For example, if the premises 102 has a microcontroller for controlling a lighting system 304, the initial configuration may include establishing a connection (e.g., wireless connection) between the premises automation controller 302 and the microcontroller. In comparison, if the premises 102 does not have such a microcontroller, the premises automation controller 302 may be initially configured to discard commands designed to control lighting. In some cases, the initial configuration of step 501 may include synchronizing a system with the premises automation controller 302 so that both operate according to a similar timing, protocol, etc.

The initial configuration of step 501 may allow responses (or reactions) to the command streams to be customized. Because the same commands on command streams may be sent to multiple video decoders 301 located at different premises 102, the video decoders 301 and/or premises automation controllers 302 at the different premises may be configured to react to the commands differently. For example, the premises automation controller 302 at a first premises 102 may control all lights to turn off when frequency 226 of FIG. 4 is selected to receive a command stream to turn lights off, whereas the premises automation controller 302 at a second premises 102 may control only lights inside a home to turn off when the same frequency, e.g., frequency 226 of FIG. 4, is selected at the second premises 102.

The initial configuration of step 501 may allow for even further customization on a user by user basis. That is, in some cases, the initial configuration of step 501 may include setting up user profiles or user preferences. For example, one user may desire that the heating/cooling system 305 be set to a first temperature when they are going to bed, and therefore, the user may set up a user profile so that when a goodnight frequency is selected by that user, the premises automation controller 302 may control the thermostat of the heating/cooling system 305 to adjust to that temperature. Another user of the same premises automation controller 302 may set up another profile to set the thermostat to a different temperature when he/she selects the goodnight frequency.

Also, step 501 may include pushing new software to the video decoder 301, premises automation controller 302, and/or any of the systems that the premises automation controller 302 may control. Command streams may be updated and/or upgraded to provide new commands as new products are made available. Therefore, the video recorder 301 may be updated to identify the new command streams. For example, a new frequency may be added to cause an emergency contact to be called, and thus, the video decoder 301 may be updated at step 501 to recognize the new frequency as having a command stream. Also, as new products are developed and available for installation on a premises 102, command streams may have the ability to control them, and therefore, the premises automation controller 302 may be provided with software for communicating commands to the new products. For example, a new device for locking and unlocking a door may be integrated with the security system 306, and therefore, the premises automated controller 302 may be provided with software for instructing the new device to lock and unlock doors when arm and disarm frequencies (see, e.g., frequencies 224 and 225 of FIG. 4) are selected.

Further, step 501 may include a datastream generation process performed by one or more devices in the local office 103 (e.g., application servers 107). In the datastream generation process, an application server 107 may encode content to generate a content stream. For example, the application server 107 may retrieve content from a database storing content or another device (e.g., content server 106), and encode the content according to a predetermined protocol (e.g., an MPEG standard). The database generation process may also include a step of generating commands according to criteria (which may be specified by an administrator or other authorized individual) and pre-programmed rules for translating the criteria into the commands, so that the commands may have a pre-defined data structure. After generating the commands, the datastream generation process may generate a command stream by encoding the commands according to an audio, video, or audiovisual data coding protocol (e.g., MPEG standard), which may be the same protocol or a different protocol as the protocol used to encode content. In some embodiments, the datastream generation process may include converting one or more content streams into one or more commands streams by replacing content (e.g., audio, video, audio-video, etc.) with a repeating set of commands (e.g., premises automation commands). After generating each of the content streams and command streams, the datastream generation process may perform a step of choosing which frequency to use for transmitting the content streams and command streams. Each content stream and command stream may be assigned its own frequency and transmitted according to that frequency. Specifically, the content streams and commands streams may be transmitted (e.g., broadcasted, multicasted, etc.) to various premises 102 through the communication network 100.

Step 502 may include determining which frequency to tune to so that a corresponding datastream may be retrieved. In some embodiments, the video decoder 301 may be configured so that it is always tuned to and decoding at least one frequency. That frequency may be whatever frequency was most recently selected or a default frequency. In step 502, the video decoder 301, or another device connected thereto, may determine whether a user has selected a frequency. A user may select a frequency by using a remote control, a tablet or smartphone, hand gestures, voice commands, etc. If the user selects a frequency, then the video decoder 301 may tune to the selected frequency. If the user does not select a frequency, then the video decoder may stay tuned to whatever frequency it was previously tuned to. Step 502 may be performed repeatedly until a frequency to tune to is determined.

In some embodiments, at step 502, the frequency may be selected by a video recording system (e.g., a DVR) in accordance with a schedule. Users may set their DVR to record a frequency associated with a command stream at certain dates and times. In other words, users may set up a schedule that designates times at which certain datastreams, including command streams and/or content streams, are to be recorded. When the time arrives to record a set frequency, the DVR may instruct the video decoder 301 to tune to a particular frequency. If the tuned to frequency includes a command stream, then the DVR may effectively cause the video decoder 301 to carry out automation control of an appropriate system based on the command stream. For example, if a user sets their DVR to record frequency 226 at 11 PM, when the DVR goes to record frequency 226 at that time, the lights may be turned off. In this manner, a DVR may be used as an interface to schedule automated events on a premises 102.

At step 503, the video decoder 301 may be tuned to the frequency determined in step 502. Further, the video decoder 301 may begin to decode the datastream carried at that frequency. Where the datastream includes an MPEG datastream, the video decoder 301 may include an MPEG decoder. Various types of compression algorithms may be used to transport datastreams from the local office 103 downstream to premises 102, and therefore, the video decoder 301 may be configured to decompress datastreams according to various decompression algorithms.

In some embodiments, the video decoder 301 may always be tuned to and decoding one or more out-of-band frequencies in addition to the frequency determined at step 502 (which may be referred to as an in-band frequency). The local office 103 may inform the video decoder 301 of the frequency it should set as its out-of-band frequency to monitor. Such out-of-band frequency may change from time to time, or additional out-of-band frequencies may be added, and therefore, the video decoder 301 may, at times, receive messages from the local office 103 updating which out-of-band frequency (or frequencies) to monitor.

In step 504, the video decoder 301 may determine whether the datastream is a content stream. In other words, the video decoder 301 may determine whether the datastream 301 includes audio, video, and/or audio/video content. In some cases, this determination may be made by referring to a logical channel map correlating frequencies with datastream types (e.g., content streams or command streams) or by referring to a program guide 400, which may include metadata embedded therein that indicates which frequencies are associated with which type of datastream (e.g., content streams or command streams). The video decoder 301 may compare the frequency selected and tuned to with the channel map or program guide 400 and determine whether the frequency selected and tuned to is associated with a content stream or a command stream. For example, referring to the program guide 400 in FIG. 4, when frequency 224 is selected and tuned to, the video decoder 301 may extract metadata associated with frequency 224 from the program guide 400 and use the metadata to determine whether frequency 224 is a command stream or content stream.

In other embodiments, the determination of step 504 may be made by analyzing the data in the datastream. For example, the video decoder 301 may determine that the data includes information for rendering an image, and therefore, conclude that the datastream is a content stream. Still, in other cases, the determination at step 504 may be made by evaluating metadata embedded within the datastream. If the metadata identifies the datastream as containing a known program, then the video decoder 301 may determine that the datastream is a content stream. When the video decoder 301 determines that the datastream is a content stream, the video decoder 301 may pass the decoded content stream to one or more output devices 303 (e.g., a display device 112). The method may then proceed to step 505 in which playback of the content in the decoded content stream is performed. That is, step 505 may include rendering images of video content on a display device 112 and/or playing audio of audio content through speakers.

In step 506, the video decoder 301 may determine whether the datastream, carried at the frequency that is tuned to at step 503, includes a command stream. In some cases, this determination may be made by referring to a channel map correlating frequencies with datastream types (e.g., content streams or command streams) or by referring to a program guide 400, which may include metadata embedded therein that indicates which frequencies are associated with which type of datastream (e.g., content streams or command streams), as described above with respect to step 504. Alternatively, the determination in step 506 may be made by comparing the data in the datastream with known commands to detect a match. In some embodiments, command streams may include a flag or other identifier for signaling to video decoder 301 that they are command streams, so the video decoder 301 may be configured to identify such flags or identifiers. Where the command stream is encoded according to an MPEG standard, the video decoder 301 may identify metadata, embedded in, for example, an I-frame of the MPEG stream, that indicates that the MPEG stream includes commands for a premises automation controller 302.

When the video decoder 301 determines that the datastream includes a command stream, the video decoder 301 may pass commands to the premises automated controller 302 in step 507. Step 507 may include transmitting wired and/or wireless communications from the video decoder 301 to the premises automated controller 302. In some embodiments, the video decoder 301 and premises automated controller 302 may be integrated within the same apparatus (e.g., a STB or DVR), and thus, passing the commands may include passing one or more parameters between different software modules and/or passing electrical signals between different ASICs.

Step 507 may further include a step of checking that a complete set of commands has been passed to the premises automated controller 302, systems 304-306, and/or sensors 307. As discussed above, the same commands may be repeated on a frequency, and thus, it might not be necessary or desirable for the video decoder 301 to continue passing the same commands to the premises automation controller 302, which in turn may repeatedly act in response to such commands. Therefore, the video decoder 301 may determine when all commands in a set of commands has been passed along to the premises automated controller 302. For example, referring to FIG. 4, when frequency 224 is selected, the video decoder 301 in step 507 may identify the beginning of a set of commands for arming a security system, start passing the set of commands, monitor the passing of the commands to ensure that all commands for arming the security system have been passed, and determine when the complete set of commands has been passed. If the video decoder 301 determines that a portion of the commands has not been passed or was not successfully passed, the video decoder 301 may pass a subsequent set of commands in the command stream. The video decoder 301 may continue to attempt to pass subsequent sets of commands until an entire set of commands has been passed. Alternatively, the video decoder 301 may buffer the commands that it attempts to pass and may resend any commands that were not successfully passed. For example, if the video decoder 301 uses a secure connection to pass commands to the premises automated controller 302 and does not receive acknowledgements from the premises automated controller 302 for all commands, then the video decoder 301 may resend portions of the commands until all commands have been successfully delivered to the premises automated controller 302.

In some cases, the video decoder 301 may only continue to attempt to pass commands for a predetermined time, and once that predetermined time is exceeded, the video decoder 301 may detect that the passing has timed-out. Where the passing of commands has timed out, the video decoder 301 may cause an alert to be outputted through the output device 303. For example, the video decoder 301 may cause a display device 112 to render a screen that indicates that passing of the commands has failed. Displaying such a failure may be desirable in a case where a person attempts to arm a security system in which case the user may want to be notified that the commands were not passed and the security system has not been armed. The video decoder 301 may select which failures are to be outputted. For example, the video decoder 301 may choose not to output a failure to pass commands for turning on or off lights as that failure may be more evident to users, and a separate alert may not be desirable.

After the video decoder 301 determines that a complete set of commands has been transmitted, the video decoder 301 may enter a floating state. In the floating state, the video decoder 301 may be free to tune to other frequencies and decode other datastreams. In some embodiments, separate processing threads may be spawned so that the video decoder 301 can use one thread to communicate commands to the premises automation controller 302 or the systems 304-306, and use another thread to process additional instructions (e.g., instructions to tune to another frequency) received from a user or other device (e.g., a DVR). As such, the video decoder 301 may enter a floating state in parallel with a state in which it continues to transmit the complete set of commands. Once a first complete set of commands is passed, it might not be necessary or desirable for the video decoder 301 to continue passing commands or even to continue decoding a command stream, and therefore, the video decoder 301 may enter into a floating state in which it is free to perform other functions. For example, the video decoder 301 may pass a complete set of commands and enter a floating state, so that it may then be directed to tune to another frequency and decode a content stream by a DVR that is scheduled to record a piece of content. Or, for example, the video decoder 301 may enter the floating state so that it can be used to decode content for a pause buffer.

In some cases, none of the one or more tuners of the video decoder 301 may be available to tune to a frequency carrying a command stream. For example, all tuners of the video decoder 301 may be busy recording content on other frequencies and/or used as pause buffers. In some embodiments, during such circumstances, the video decoder 301 may determine whether or not to break one of the tuner connections. In particular, the video decoder 301 may determine to break a tuner connection to tune to a frequency to call 911 (e.g., frequency 228 in FIG. 4) because of the emergency nature of that frequency. If the frequency is not associated with such an emergency action and no tuners are available, the video decoder 301 may use a cached version of the command stream at that frequency. In other words, in some embodiments, the video decoder 301 may cache command streams of particular frequencies so that it can use the cached version when no tuners are available. Still, in some cases, before using the cached version, the video decoder 301 might break a tuner connection to quickly switch over to the selected frequency to check on the version of the command stream at that frequency. Notably, such switching to check the version may be quicker than if the tuner were to switch to read the entire command stream. If the version is the same as a cached version, the video decoder 301 may proceed to use the cached version. Otherwise, the video decoder 301 might determine to break a tuner connection to read the entire command stream or wait for a tuner to become available to read the entire command stream. With respect to the cached versions discussed above, the video decoder 301 may periodically (e.g., every night at midnight), or when a tuner is available, tune to certain frequencies and cache command streams. Accordingly, the video decoder 301 may include a local cache or connect to a remote cache to store the cached versions of the command streams.

At step 508, the premises automated controller 302 may identify systems to control. This identification may be based on the commands received from the video decoder 301. For example, if the commands relate to turning on/off lights, then the premises automated controller 302 may identify the lighting system 304 as a system to control. Or, for example, if the commands relate to adjusting a thermostat, then the premises automated controller 302 may identify the heating/cooling system 305 as a system to control.

Additionally, or alternatively, the commands may include codes that identify the systems that they are compatible with. For example, referring to FIG. 4, frequency 224 may carry commands including an alphanumeric code (e.g., A5) that identifies a security system associated with that alphanumeric code, so that the video decoder 301 decoding the commands, or the premises automation controller 302 connected thereto, may determine whether the commands on frequency 224 can be used to arm the security system present on the premises 102. In this regard, frequency 224 may include commands for arming a security system for a number of different security systems. For example, the frequency 224 may carry a first code for a first security system followed by commands for arming the first security system as well as a second code for a second security system followed by commands for arming the second security system. As a result, neighbors, who might receive the same datastreams on the same frequencies, and thus the same commands, may be able to select the same frequency to arm their respective security systems, which may be different.

In some embodiments, step 508 may identify multiple systems to control. For example, a "Goodnight" frequency (see, e.g., frequency 227 of FIG. 4) may include commands for turning off lights and arming a security system. In this example, the premises automation controller 302 may identify that commands on the "Goodnight" frequency are directed at controlling both a lighting system 304 and security system 306. Thus, the premises automation controller 302 may identify both systems in response to commands on a single frequency. In another example, a "Wake-up" frequency may include commands for turning on lights, disarming a security system, and even activating a coffee machine (yet another example system) to make a cup of coffee. Again, this example shows that multiple systems can be controlled with the selection of a single frequency.

Moreover, the systems identified in step 508 may be identified based on user preferences. These user preferences may be stored on the video decoder 301, the premises automation controller 302, or another device connected thereto. The user preferences may be associated with a particular premises 102. Continuing with the example "Goodnight" frequency described above, a premises automation controller 302 may consult user preferences, which are associated with a particular premises 102 and the "Goodnight" frequency when a video decoder 301 at the same premises 102 is operated to tune to and decode the "Goodnight" frequency. Using the user preferences for the selection of the "Goodnight" frequency at the premises 102, the premises automated controller 302 may identify whether to control only one of the lighting system 304 and the security system 306 or both systems. At some premises 102, a lighting system 304 might not be controllable, and therefore, the corresponding premises automation controller 302 may only identify the security system in response to the "Goodnight" frequency. At other premises 102, a security system 306 might not be installed, and therefore, the corresponding premises automation controller 302 may only identify the lighting system 304 in response to the "Goodnight" frequency. Still, at some premises, a lighting system 304 and security system 306 may be available and controllable, and therefore, the corresponding premises automated controller 302 may identify both systems.

At a more granular level, the user preferences may be associated with the individual that selected the frequency at step 502. Again, continuing with the example "Goodnight" frequency described above, the premises automation controller 302 may consult user preferences associated with the individual that selected the "Goodnight" frequency to identify which systems are to be controlled. If a first user selects the "Goodnight" frequency, the premises automated controller 302 may identify that both the lighting system 304 and security system 306 are to be controlled. If a second user selects the "Goodnight" frequency at the same premises 102, the premises automated controller 302 may determine that the second user does not wish for the lights to be turned off, and therefore, may identify the security system 306 as being the only system to be controlled.

Also, in some cases, certain systems may exist on one premises 102 and not on another. When the premises automated controller 302 receives commands related to a system that is not present on a corresponding premises 102, the premises automated controller 302 may discard those commands. For example, if a premises 102 does not have a security system, but the premises automated controller 302 of that premises 102 receives commands for arming a security system and turning on motion activated lights, then the premises automated controller 302 may discard the commands for arming an alarm system and only act on the commands for turning on motion activated lights.

After identifying a system(s) to control, step 509 is performed to control the identified system(s). In some examples, step 509 may include sending commands from the premises automated controller 302 to a microcontroller of an identified system, which then in turn controls components within the system. In other words, the premises automated controller 302 may communicate with another system specific controller to control endpoints in a particular system. For example, the premises automated controller 302 may send a code (which may include, e.g., a password) to a security system panel, which in turn may arm or disarm a part (or all parts) of the security system.

In other examples, the premises automated controller 302 may directly control components in the identified system. In other words, the premises automated controller 302 may control operations of endpoints of a particular system without first supplying the commands to a specific controller of the particular system. For example, the premises automated controller 302 may send signals to switches to turn on/off lights in the lighting system 304. Or, for example, the premises automated controller 302 may send signals to one or more sensors in a security system to activate the one or more sensors. Accordingly, step 509 may include translating commands in the command stream into more specific commands designed for instructing the particular systems located on the premises 102 of the premises automated controller 302. Because the same commands may be transmitted (e.g., broadcasted) to multiple premises having varying systems, each premises automated controller 302 may be configured to convert the commands to specially designed commands for the particular systems in place at the premises 102.

Control of the systems 509 may also be based on user preferences. In other words, systems at a premises 102 may be controlled differently in accordance with user preferences of different users when they select the same frequency. For example, when a first user selects the "Goodnight" frequency, the premises automated controller 302 may determine that the first user desires the thermostat temperature to be set to a first temperature, and thus, the premises automated controller 302 may control the heating/cooling system 305 accordingly. In comparison, when a second user selects the same "Goodnight" frequency at the same premises 102, the premises automated controller 302 may determine that the second user desires the thermostat temperature to be set to a second temperature, and thus, the premises automated controller 302 may control the heating/cooling system 305 according to user preferences of the second user.

Further, in step 509, the premises automated controller 302 may check whether the commands sent to the system(s) were successfully sent. This may include determinations similar to those made in step 507 with regards to checking that commands were successfully passed from the video decoder 301 to the premises automated controller 302. For example, the premises automated controller 302 may analyze acknowledgements from the system(s) it is communicating with to determine that all commands were received. If less than all commands were received, the premises automated controller 302 may continue to attempt to send the commands.

In step 510, the video decoder 301 and/or premises automation controller 302 may output feedback from the system(s). For example, the video decoder 301 and/or premises automation controller 302 may receive confirmation from a system that the commands were received, acted on, and/or successful. The video decoder 301 and/or premises automation controller 302 may then output an alert indicating a status of the system that was recently controlled thereby notifying a user of the status. For example, if the user selects a frequency to arm a security system, once the security system is armed, the video decoder and/or premises automation controller 302 may render a message on the screen of a display device 112 indicating that the security system has been successfully armed. In contrast, if the security system is not successfully armed, for example, because a window is open or a door is ajar, the video decoder 301 and/or premises automation controller 302 may render a message indicating that arming was unsuccessful. In some cases, the message may include details explaining why the arming, or other system control (e.g., turning on lights), was unsuccessful.

It should be understood that the steps in the method of FIG. 5 may be performed in a different order, and that some steps may be omitted and others may be added. For example, step 506 may be performed immediately after step 503 to determine whether the datastream being decoded includes a command stream. If so, step 504 for determining whether the datastream includes a content stream might not be performed. Or, if the video decoder 301 determines that the datastream does not include a command stream, then step 504 might not be determined because it may be assumed that the datastream is a content stream.

Figure 6:
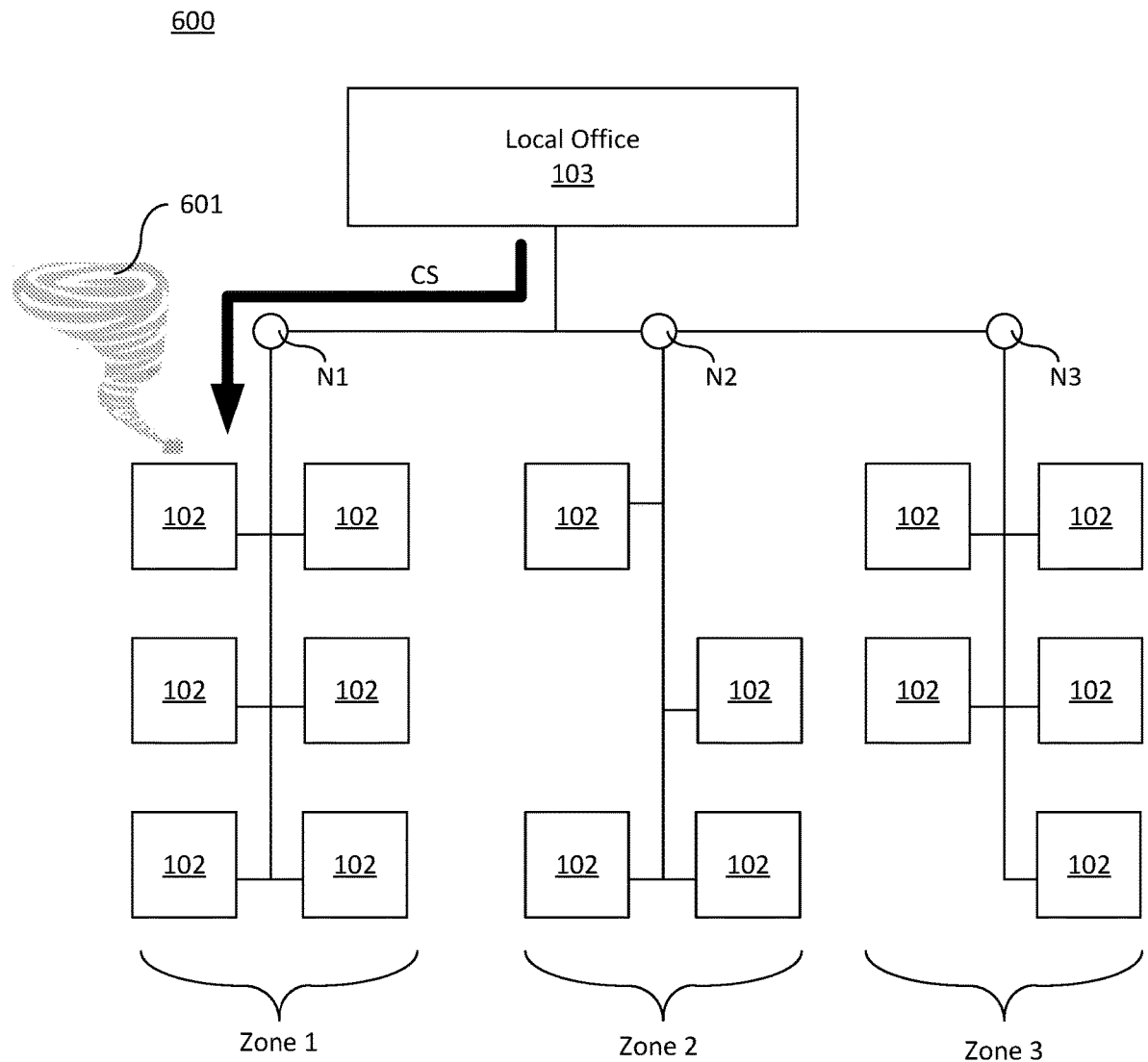
FIG. 6 illustrates an example use case of a system in accordance with aspects of the present disclosure.

FIG. 6 illustrates an example use case of a system 600 in accordance with aspects of the present disclosure. More specifically, FIG. 6 illustrates features of the system 600 when a tornado 601 may impact the system 600. As shown in FIG. 6, the system 600 may include a local office 103 and a plurality of premises 102, where one or more of the premises 102 has its own video decoder 301 and premises automation controller 302. The plurality of premises 102 may be grouped into geographical zones (which may correspond to zip codes, area codes, etc.). Specifically, FIG. 6 shows three zones, labeled Zone 1, Zone 2, and Zone 3, each comprising a number of premises 102. Premises 102 in the same zone may share a common node. As depicted in FIG. 6, premises 102 in Zone 1 may be connected to a first node N1, premises 102 in Zone 2 may be connected to a second node N2, and premises 102 in Zone 3 may be connected to a third node N3. Although only several premises 102 are shown connected to each of the nodes N1, N2, and N3, it should be understood that many more premises (e.g., hundreds of premises 102) may be connected to each of the nodes N1, N2, and N3.

In the use case of FIG. 6, the tornado 601 may be deemed as a threat to only premises 102 in Zone 1. This determination may be made by the local office 103 or another organization, such as the National Weather Service. In some cases, a weather tracking organization, such as the National Weather Service, may notify the local office 103 that the tornado 601 exists, and may impact a certain area. In such cases, the local office 103 may determine that premises 102 in Zone 1 may correspond to that area. The local office 103 may then generate and send a command stream CS with commands for sounding an alarm indicating that a tornado warning is in effect. The command stream CS may be transmitted on a designated frequency to node N1. As a result, any premises 102 in Zone 1 (which is connected to node N1) that has a video decoder 301 may decode the command stream CS. Notably, the video decoder 301 may always be tuned to the designated frequency and decoding data sent at the designated frequency. In particular, the video decoder 301 may decode one frequency having a content stream and pass the content stream to a display device 112 so that a user may consume the content, and at the same time, may tune to and decode data at an out-of-band frequency corresponding to the designated frequency that may carry the tornado warning commands.

When a video decoder 301 in a premises 102 in Zone 1 decodes the command stream CS including the tornado warning commands, the video decoder 301 may pass the commands to a corresponding premises automation controller 302. The premises automation controller 302 may then interpret the commands and control systems on its premises 102 as appropriate. For example, in the case where the premises automation controller 302 receives tornado warning commands, the premises automation controller 302 may control a speaker to sound a specific tornado warning alarm and/or control a lighting system 304 to turn on certain lights thereby illuminating a path to a tornado safe spot (e.g., underground shelter).

Of course, sounding an alarm and lighting up a pathway when a tornado occurs are just some uses of the system 600. Many other uses are contemplated. For example, if the local office is notified of a robbery, premises break-in, or other crime in a zone, the local office 103 may send commands on an out-of-band command stream that can cause a video decoder 301 and premises automation controller 302 of a premises 102 in that zone to arm a security system (or take other actions). In particular, if a home is broken into, the system 600 may be configured to arm a security system of a neighboring home.

While the above described uses illustrate the benefits of alerting users during an emergency, the system 600 may be used for non-emergency uses as well. In particular, commands on the out-of-band frequency may be configured for controlling systems in a manner to augment, enhance, or otherwise supplement content being consumed. For example, if a user is watching a movie included within a content stream, the video decoder 301 may also decode an out-of-band frequency carrying a command stream that controls the lighting system 304 to turn on/off or adjust the brightness of lights in accordance with the movie. In this example, the command stream may be synchronized with the content stream so that the lights may be dimmed during a scary or nighttime scene and brightened during a non-scary or daytime scene. Other content related command streams may also be generated and transmitted from the local office 103 to premises 102.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
   receiving, by a computing device, a datastream comprising a plurality of commands associated with performing a plurality of premises system functions;
   receiving a user selection of a user setting, wherein the user setting is associated with performance of one or more premises system functions; and
   based on the user selection of the user setting, causing performance, by the computing device, of the one or more premises system functions by sending one or more commands selected, based on compatibility with a premises system at a premises of the computing device, from the plurality of commands in the datastream, wherein a quantity of the selected one or more commands is less than a quantity of the plurality of commands in the datastream.

2. The method of claim 1, wherein the causing performance comprises causing performance of different premises system functions using different commands of the plurality of commands in the datastream.

3. The method of claim 1, wherein the user setting is one of a plurality of user settings associated with different performance of the one or more premises system functions for different users.

4. The method of claim 1, wherein the one or more premises system functions comprise one or more of:
   arming of a premises system;
   disarming of a premises system;
   turning on a light;
   turning off a light;
   adjusting a thermostat;
   locking a door;
   unlocking a door;
   communicating via an intercom system;
   initiating a telephone call; or
   controlling an appliance.

5. The method of claim 1, further comprising:
   receiving a second user selection of a second user setting, wherein the second user setting is associated with performance of one or more second premises system functions; and
   based on the second user selection of the second user setting, causing performance of the one or more second premises system functions by sending one or more second commands selected from the plurality of commands in the datastream.

6. The method of claim 1, wherein the user selection comprises at least one of:
   a selection of a portion of an interface; or
   a selection of a channel.

7. The method of claim 1, wherein the causing performance comprises sending the one or more commands to a controller configured to control one or more premises systems to perform the one or more premises system functions.

8. The method of claim 1,
   wherein the datastream comprises a multicasted datastream and the plurality of commands in the multicasted datastream are associated with performing the plurality of premises system functions via a plurality of different premises systems at a plurality of different premises.

9. The method of claim 1, further comprising:
   receiving, by the computing device, the user setting indicating the one or more premises system functions selected by a user; and
   storing the user setting in association with an option that is associated with the datastream and causes performance of the one or more premises system functions when selected by the user.

10. The method of claim 1, further comprising:
    selecting the one or more commands, from the plurality of commands, that are compatible with one or more premises systems for performing the one or more premises system functions at the premises of the computing device,
    wherein the datastream comprises one or more commands that are incompatible with the one or more premises systems for performing the one or more premises system functions at the premises of the computing device.

11. The method of claim 1, wherein the receiving the datastream comprises receiving the datastream via at least one of:
    a service provider;
    a content provider;
    a wide area network provider;
    a local office of a communication network;
    a termination system; or
    a content server.

12. An apparatus comprising:
    one or more processors; and
    memory storing instructions that, when executed by the one or more processors, cause the apparatus to:
      receive a datastream comprising a plurality of commands associated with performing a plurality of premises system functions;
      receive a user selection of a user setting, wherein the user setting is associated with performance of one or more premises system functions; and
      based on the user selection of the user setting, cause performance of the one or more premises system functions by sending one or more commands selected, based on compatibility with a premises system at a premises of the apparatus, from the plurality of commands in the datastream, wherein a quantity of the selected one or more commands is less than a quantity of the plurality of commands in the datastream.

13. The apparatus of claim 12, wherein the instructions, when executed by the one or more processors, cause the apparatus to:
    cause performance of different premises system functions using different commands of the plurality of commands in the datastream.

14. The apparatus of claim 12, wherein the user setting is one of a plurality of user settings associated with different performance of the one or more premises system functions for different users.

15. The apparatus of claim 12, wherein the one or more premises system functions comprise one or more of:
    arming of a premises system;
    disarming of a premises system;
    turning on a light;
    turning off a light;
    adjusting a thermostat;
    locking a door;
    unlocking a door;
    communicating via an intercom system;
    initiating a telephone call; or
    controlling an appliance.

16. The apparatus of claim 12, wherein the instructions, when executed by the one or more processors, cause the apparatus to:
    receive a second user selection of a second user setting, wherein the second user setting is associated with performance of one or more second premises system functions; and
    based on the second user selection of the second user setting, cause performance of the one or more second premises system functions by sending one or more second commands selected from the plurality of commands in the datastream.

17. The apparatus of claim 12, wherein the user selection comprises at least one of:
    a selection of a portion of an interface; or
    a selection of a channel.

18. The apparatus of claim 12, wherein the instructions, when executed by the one or more processors, cause the apparatus to cause performance of the one or more premises system functions by sending the one or more commands to a controller configured to control one or more premises systems to perform the one or more premises system functions.

19. A system comprising:
- a first computing device configured to send a datastream comprising a plurality of commands associated with performing a plurality of premises system functions; and
- a second computing device configured to:
  - receive the datastream;
  - receive a user selection of a user setting, wherein the user setting is associated with performance of one or more premises system functions; and
  - based on the user selection of the user setting, cause performance of the one or more premises system functions by sending one or more commands selected, based on compatibility with a premises system at a premises of the second computing device, from the plurality of commands in the datastream, wherein a quantity of the selected one or more commands is less than a quantity of the plurality of commands in the datastream.

20. The system of claim 19, wherein the second computing device is configured to cause performance of different premises system functions using different commands of the plurality of commands in the datastream.

21. The system of claim 19, wherein the user setting is one of a plurality of user settings associated with different performance of the one or more premises system functions for different users.

22. The system of claim 19, wherein the one or more premises system functions comprise one or more of:
- arming of a premises system;
- disarming of a premises system;
- turning on a light;
- turning off a light;
- adjusting a thermostat;
- locking a door;
- unlocking a door;
- communicating via an intercom system;
- initiating a telephone call; or
- controlling an appliance.

* * * * *